(12) United States Patent
Thomas

(10) Patent No.: US 12,162,435 B1
(45) Date of Patent: Dec. 10, 2024

(54) VEHICLE MOUNTED SHOE CLEANER

(71) Applicant: Wesley Thomas, Tucson, AZ (US)

(72) Inventor: Wesley Thomas, Tucson, AZ (US)

( * ) Notice: Subject to any disclaimer, the term of this patent is extended or adjusted under 35 U.S.C. 154(b) by 314 days.

(21) Appl. No.: 17/705,065

(22) Filed: Mar. 25, 2022

(51) Int. Cl.
*B60R 3/04* (2006.01)
*A47L 23/26* (2006.01)

(52) U.S. Cl.
CPC ............... *B60R 3/04* (2013.01); *A47L 23/26* (2013.01)

(58) Field of Classification Search
CPC .................................. A47L 23/26; B60R 3/04
See application file for complete search history.

(56) References Cited

U.S. PATENT DOCUMENTS

| | | | | |
|---|---|---|---|---|
| D248,816 S | * | 8/1978 | Futami | D32/47 |
| 6,363,567 B1 | * | 4/2002 | Woodward | B60R 3/04 280/164.2 |
| 6,898,817 B1 | | 5/2005 | Jackson | |
| 7,363,677 B1 | * | 4/2008 | Owens | B60R 9/06 280/164.2 |
| 7,513,519 B2 | | 4/2009 | Sharpe | |
| 9,925,924 B1 | * | 3/2018 | Grabowski | B60R 3/04 |
| 2002/0031639 A1 | * | 3/2002 | Ullman | A47L 23/26 428/137 |
| 2005/0005382 A1 | * | 1/2005 | Korodi | A47L 23/266 15/215 |
| 2007/0186359 A1 | * | 8/2007 | Rattray | A47L 23/22 15/36 |
| 2008/0092318 A1 | * | 4/2008 | Sharpe | B60R 3/04 15/215 |
| 2009/0113649 A1 | * | 5/2009 | Drumm | A63B 57/60 15/161 |
| 2014/0311523 A1 | * | 10/2014 | Best | B60R 3/04 134/6 |

* cited by examiner

*Primary Examiner* — Brian L Swenson
(74) *Attorney, Agent, or Firm* — Sanchelima & Associates, P.A.; Jesus Sanchelima; Christian Sanchelima

(57) ABSTRACT

A vehicle mountable shoe cleaner includes a brush plate with a plurality of bristles on the top side and pads on the bottom side. Additionally, a second plate secures to the brush plate such that a vehicle step is clamped between brush plate and the second plate. The shoe cleaner may be configured with a brush plate mounted to two ring clamps for mounting to a tubular vehicle step. In another embodiment of the invention, a retractable cleaner pad is mounted to the frame of the vehicle.

10 Claims, 8 Drawing Sheets

VEHICLE MOUNTED SHOE CLEANER

II. BACKGROUND OF THE INVENTION

1. Field of the Invention

The present invention relates to a vehicle mounted shoe cleaner and, more particularly, to a vehicle mounted shoe cleaner that mounts to a round pipe of a vehicle or may be retractably mounted to the frame of a vehicle.

2. Description of the Related Art

Several designs for vehicle shoe cleaners have been designed in the past. None of them, however, include a vehicle mountable shoe cleaner including a brush plate with a plurality of bristles on the top side and pads on the bottom side. Additionally, a second plate secures to the brush plate such that a vehicle step is clamped between brush plate and the second plate. The shoe cleaner may be configured with a brush plate mounted to two ring clamps for mounting to a tubular vehicle step. In another embodiment of the invention, a retractable cleaner pad is mounted to the frame of the vehicle. It is known that entering a vehicle often brings in dirt and debris from one's shoe. Therefore, there is a need for a shoe cleaner that aids in eliminating dirt and debris before entering the vehicle.

Applicant believes that a related reference corresponds to U.S. Pat. No. 6,898,817 issued for a mountable brush apparatus for cleaning the soles of shoes. Applicant believes that another related reference corresponds to U.S. Pat. No. 7,513,519 issued for a cleaning device that mounts to a vehicle step for cleaning footwear. However, the cited references differ from the present invention because they fail to disclose a shoe cleaner with pads that are mountable to the vehicle.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a vehicle mounted shoe cleaner that aids in removing dirt and debris from a user's shoe to maintain a clean vehicle environment.

It is another object of this invention to provide a vehicle mounted shoe cleaner that includes replaceable brush pads to maintain a hygienic cleaning apparatus for the vehicle.

It is still another object of the present invention to provide a vehicle mounted shoe cleaner that can be universal and fits a variety of vehicle steppers.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a first embodiment of vehicle mounted shoe cleaner 10 mounted to a vehicle, wherein said cleaner covers just a portion of the vehicle step.

FIG. 2 shows a side view of the first embodiment of vehicle mounted shoe cleaner 10 depicting a pad assembly 20 and a brush assembly 40.

Figure 6:
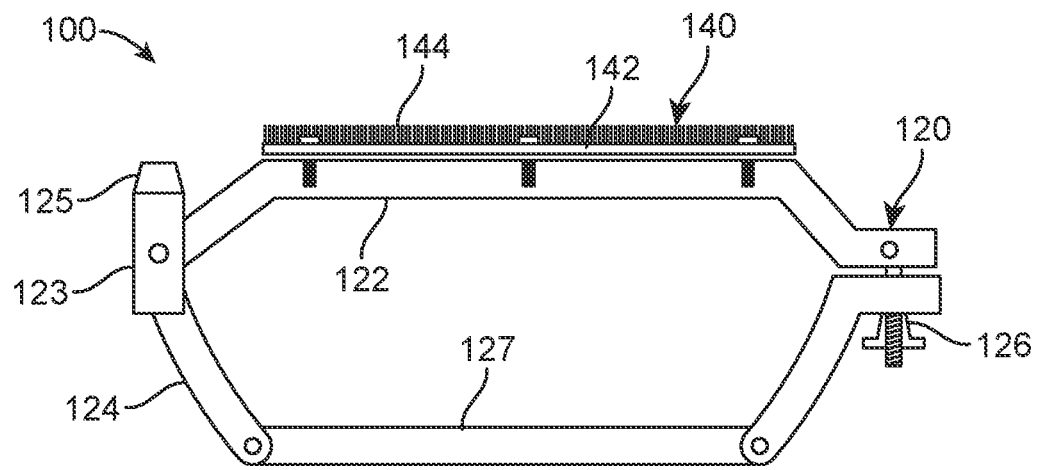

FIG. 6 illustrates a side view of a vehicle mounted shoe cleaner 100 in accordance with another embodiment of the present invention comprising a pad assembly 120 and a brush assembly 140.

Figure 7:
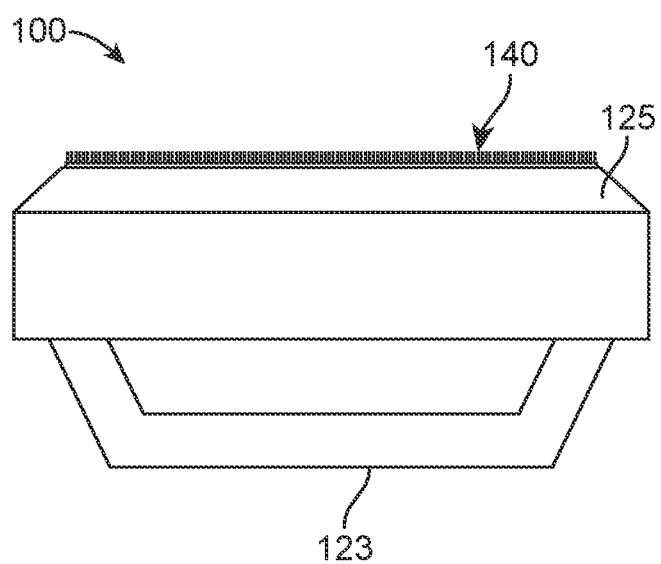

FIG. 7 represents a front view of vehicle mounted shoe cleaner 100 in a closed position, in accordance with the second embodiment of the present invention.

Figure 8:
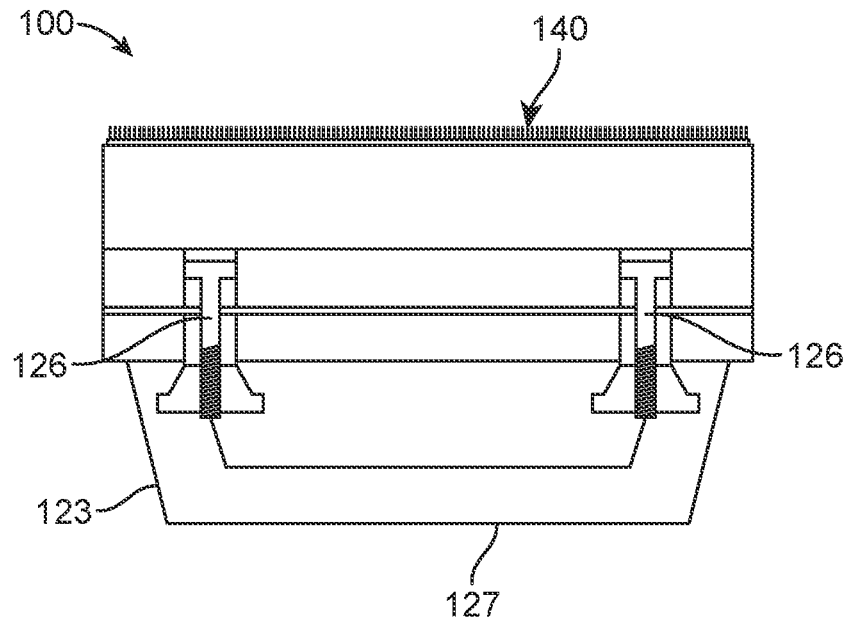

FIG. 8 shows a rear view of vehicle mounted shoe cleaner 100 depicting the position of a squeegee in accordance with the second embodiment of the present invention.

Figure 9:
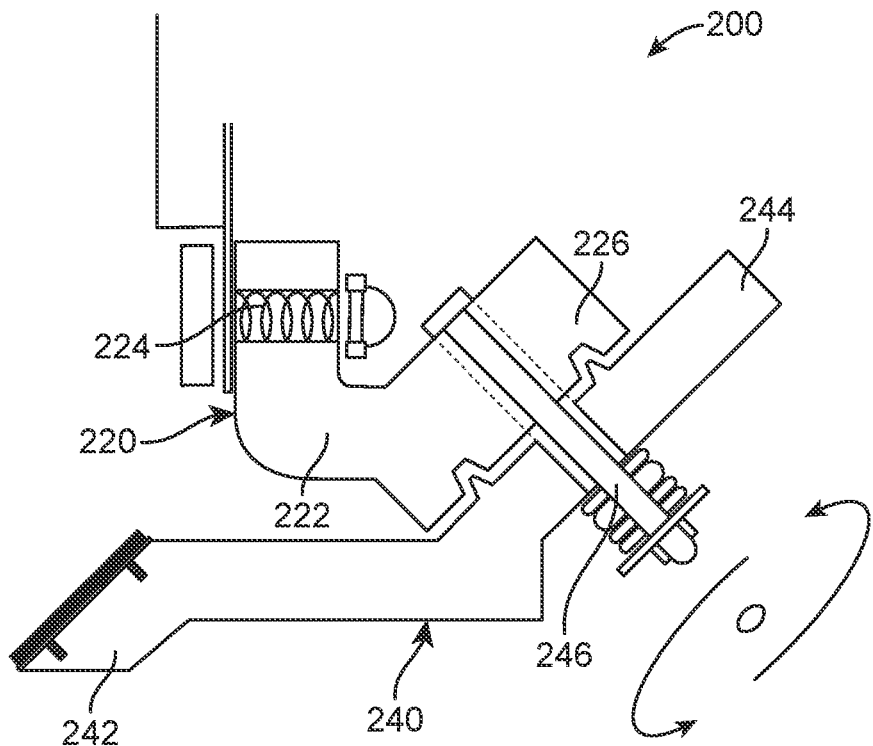

FIG. 9 illustrates a side view of vehicle mounted shoe cleaner 200 in accordance with yet another embodiment of the present invention which implements a swivel brush positioned underneath a vehicle door.

Figure 10:
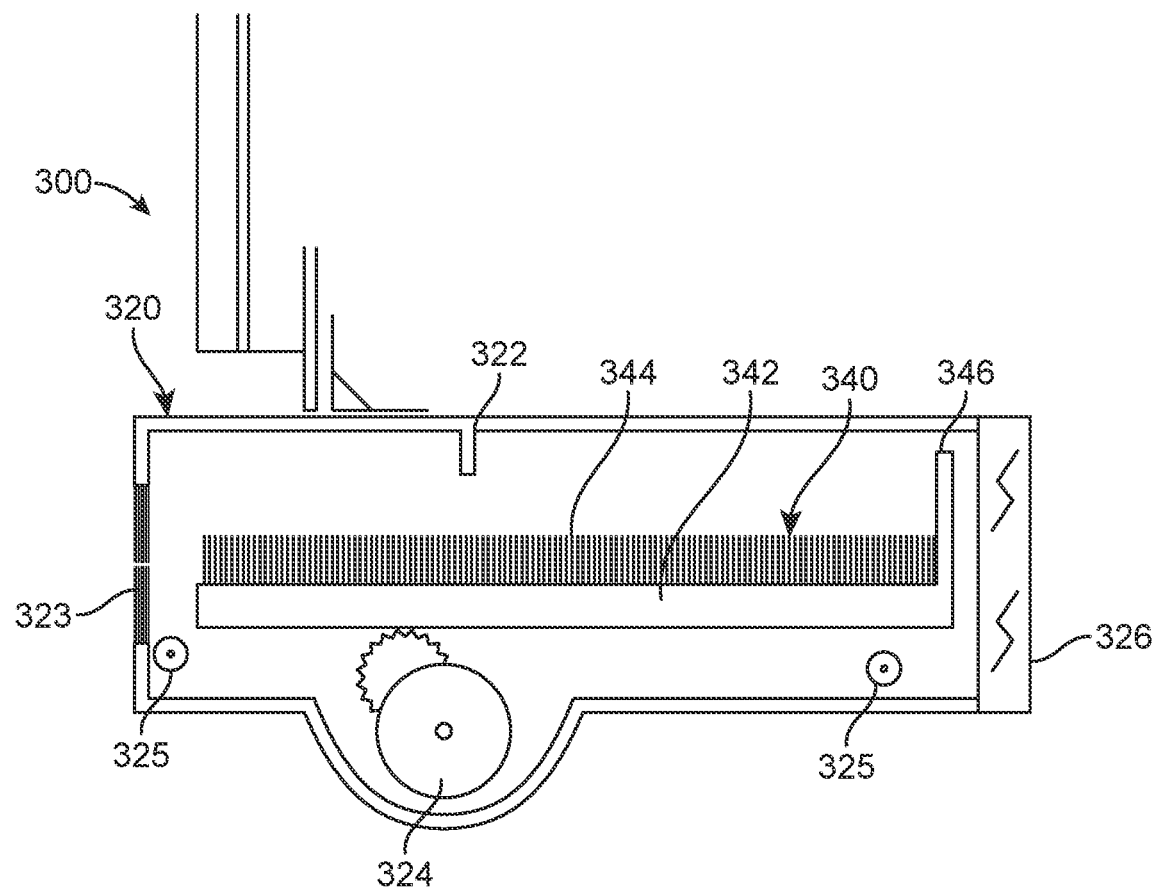

FIG. 10 is a representation of a side view of vehicle mounted shoe cleaner 300 in accordance with yet another embodiment of the present invention which implements a retractable brush pad positioned underneath a vehicle door.

Figure 11:
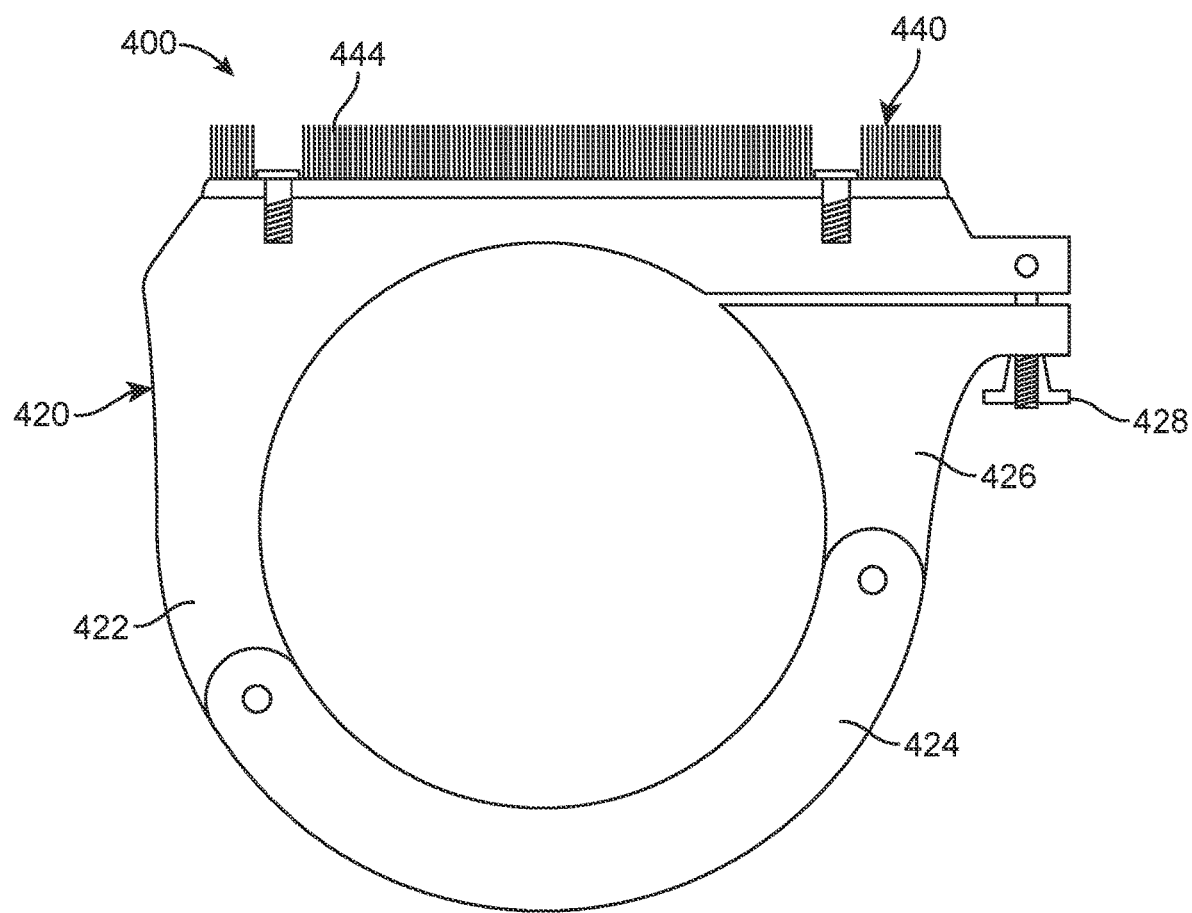

FIG. 11 depicts a side view of the round tube step brush 400 in accordance with yet another embodiment of the present invention which is intended to be implemented around cylindrical vehicle steps.

Figure 12:
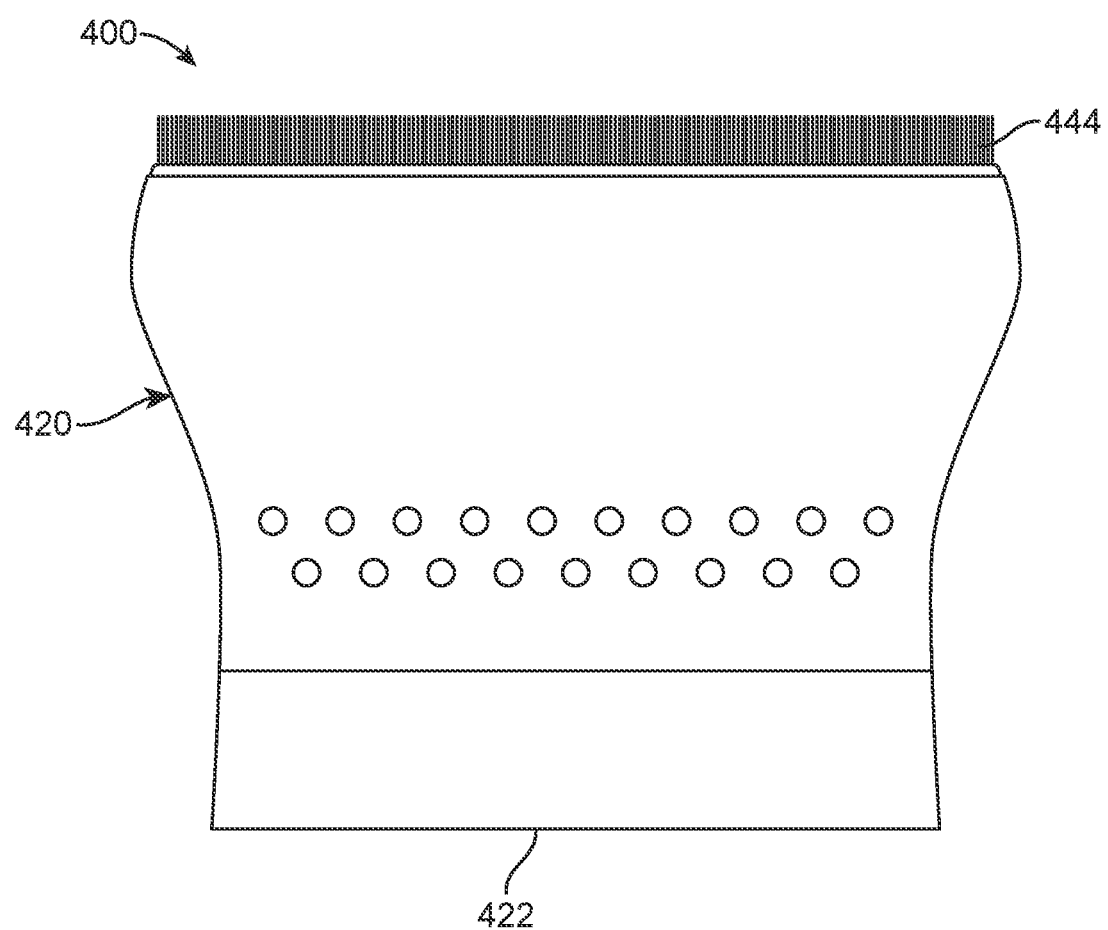

FIG. 12 represents a front view of the round tube step brush 400 in a closed position, in accordance with the third embodiment of the present invention

V. DETAILED DESCRIPTION OF THE EMBODIMENTS OF THE INVENTION

Referring now to the drawings, where the present invention is generally referred to with numeral 10, it can be observed a system for a vehicle mounted shoe cleaner 10 which basically includes a pad assembly 20 and a brush assembly 40.

Figure 1:
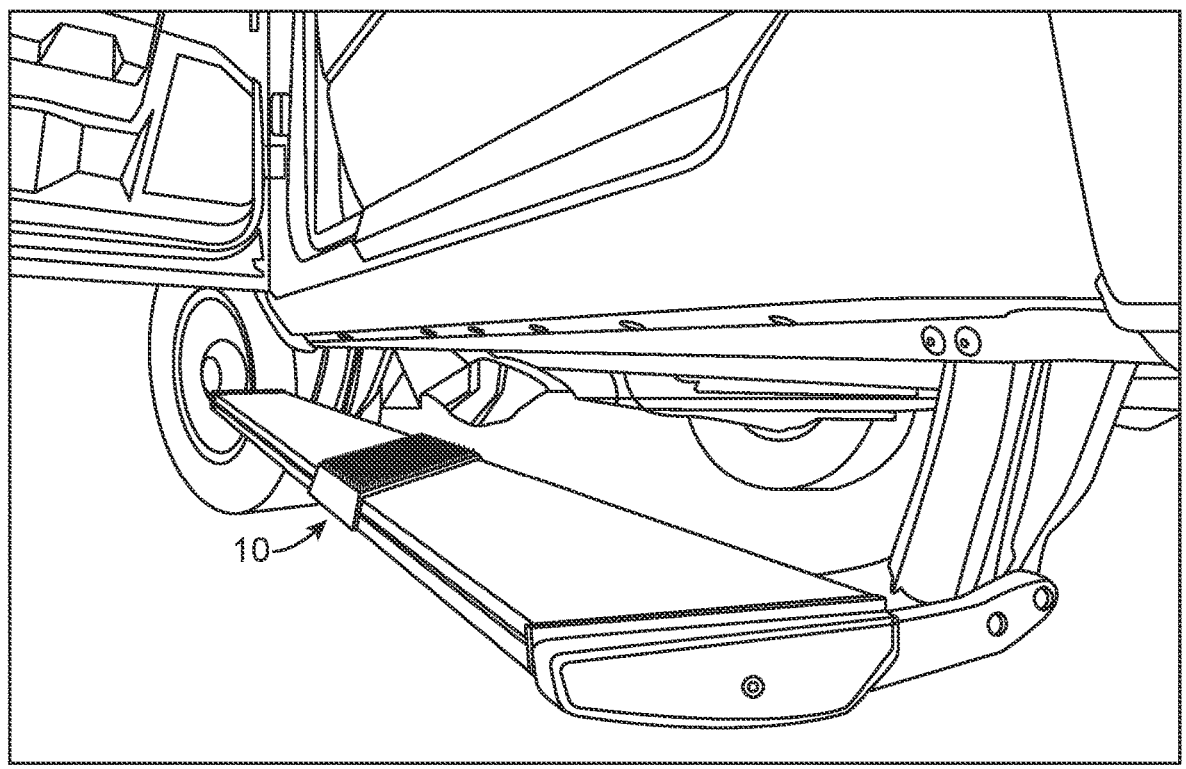
Figure 2:
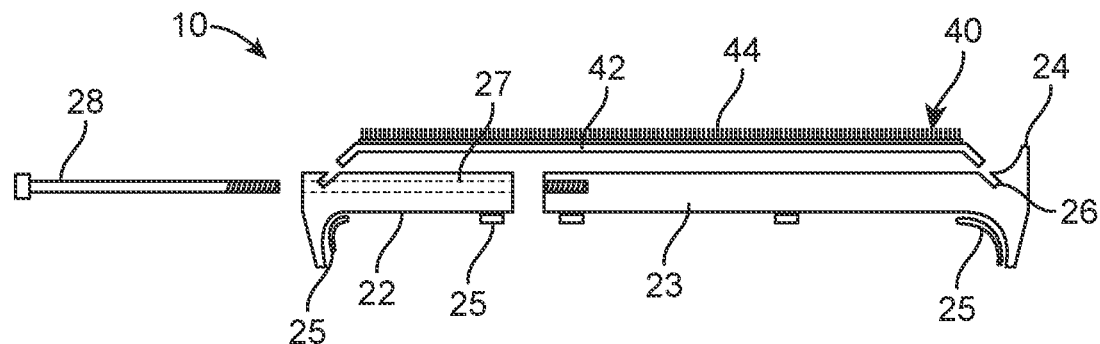
Figure 3:
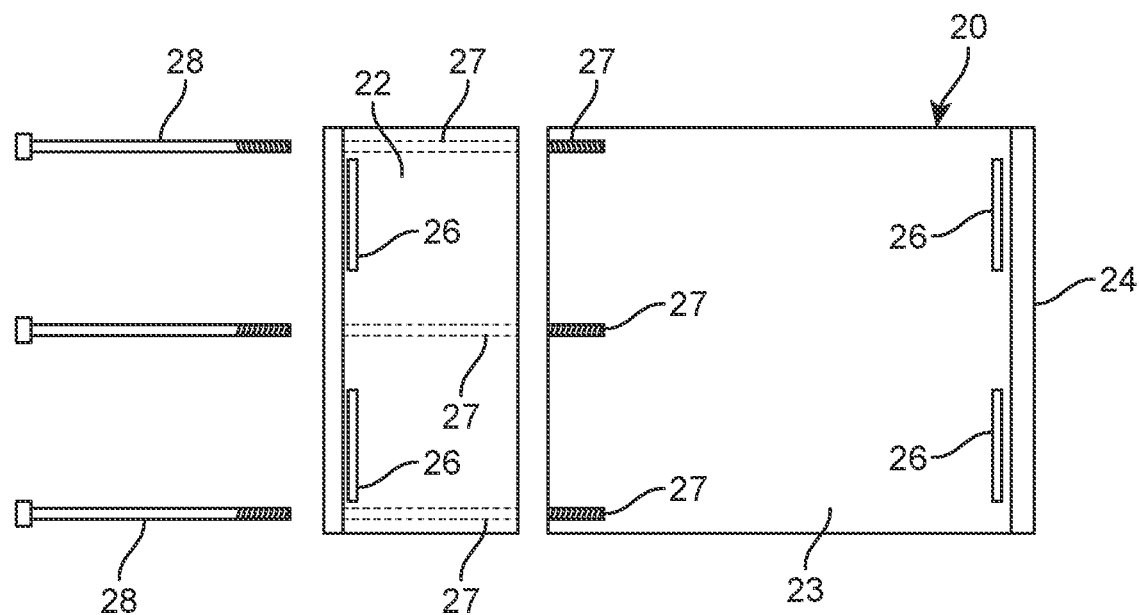
FIG. 3 illustrates a top view of pad assembly 20 of vehicle mounted shoe cleaner 10 in accordance with the first embodiment of the present invention.
Figure 4:
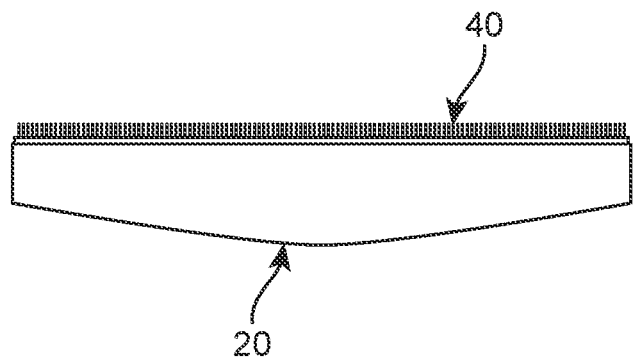
FIG. 4 is a representation of a front view of vehicle mounted shoe cleaner 10 in accordance with the first embodiment of the present invention.
Figure 5:
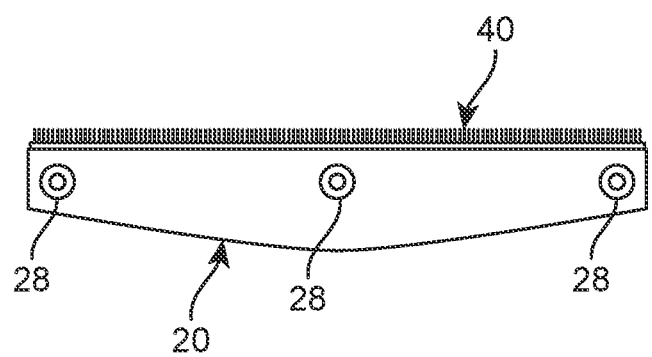
FIG. 5 shows a rear view of the vehicle mounted shoe cleaner 10 in accordance with the first embodiment of the present invention.

Pad assembly 20 includes a first portion 22 and a second portion 23 which can be effectively observed in FIGS. 2 and 3 of the provided drawings. In the present embodiment, both first portion 22 and second portion 24 are each rectangular in shape. It can be observed that first portion 22 may be provided as having smaller dimensions than that of second portion 24. In the present implementation, first portion 22 and second portion 23 are configured to form a uniform shape when joined together. The portions are then operatively mounted onto a vehicle stepper as depicted in FIG. 1 of the provided drawings. As seen in FIG. 2, first portion 22 and second portion 23 may also include curved edges along the bottom end. In the present embodiment, a lateral edge of the third portion 23 includes a raised edge 24. Raised edge 24 may extend along the entirety of the lateral edge. In one embodiment, raised edge comprises of a squeegee material and aids a user in scrapping of excess dirt and debris from under their shoe.

The bottom surface of each of the first portion 22 and the second portion 23 also includes rubber grips 25. In the present embodiment, rubber grips 25 are distributed in sections along the bottom surface of the portions. Rubber grips 25 are in abutting engagement with the stepper of a vehicle when mounted thereon. The grips prevent the portions 22 and 23 from sliding across the vehicle stepper. The top surface of each of the first portion 22 and the second portion 23 each include slots 26. Slots 26 are provided as indents or depressions that are positioned along the sides of the first portion 22 and the second portion 23. These indents or depressions partially extend inwardly within each of their respective portions.

In the present embodiment, first portion 22 and second portion 23 are abuttingly joined together. As observed in FIG. 3, each of the first portion 22 and the second portion 23 includes inner channels 27. Inner channels 27 are provided as interior through holes that extend within the portions. The inner channels 27 for the first portion 22 extend entirely through the interior, from one side edge to another thereof. Furthermore, the inner channels 27 for the second portion 23 only partially extend through the interior from one side edge thereof. In the present embodiment, the side edges which include the inner channel 27 openings are abuttingly joined together. The pad assembly 20 further includes bolts 28 which are operatively inserted through the inner channels 27. In the present embodiment, bolts 28 extend entirely through the first portion 22 through the inner channels 27 and are then threadably joined to the second portion 23.

Brush assembly 40 includes a brush pad 42 having a plurality of bristles 44 as observed in FIG. 2 of the provided drawings. In the present embodiment, brush pad 42 is a rectangular structural member that is abuttingly engaged onto the top surface of the first portion 22 and the second portion 23. It can be observed that opposing lateral edges of the brush pad 42 comprises slot members. These slot members are then operatively engaged with the slots 26 of the first portion 22 and the second portion 23. This structure allows for the brush pad 42 to be easily removable from the pad assembly 20 which in turn allows for brush pads to be easily replaceable on the system. The plurality of bristles 44 are disposed along the top side of the brush pad 42 which aid a user in wiping excess dirt and debris from the bottom of their shoe before entering the vehicle.

Referring now to FIGS. 6-8, it can be observed a system for a vehicle mounted shoe cleaner 100, in accordance with a second embodiment of the present invention which basically includes a pad assembly 120 and a brush assembly 140.

Pad assembly 120 includes a first portion 122 and a second portion 123. In the present embodiment, first portion 122 is a top portion that is operatively joined to second portion 123 which is a bottom portion. First portion 122 and second portion 123 each have a substantial U-shaped structure. Additionally, first portion 122 and second portion 123 each include a front side and a rear side. The portions may be hingedly joined via a hinge 124 along the front side that is an abutting side end of the portions. This structure allows for the system 100 to have an open configuration that could be mounted onto the stepper for a vehicle.

In the present embodiment, the front side of the first portion 122 includes a squeegee element 125. Squeegee element 125 serves as a scraper structure that allows for a user to remove excess dirt and debris from the bottom of their shoe. The element should extend along the entirety of the front side as seen in FIG. 7 of the provided drawings. When the portions are mounted to the stepper of the vehicle, it should be understood that the squeegee element 125 should be located along the exterior of the stepper. FIG. 8 observes a rear side of the portions being operatively joined together. It can be observed that the first portion 122 and the second portion 123 may be locked together by means of a wing clamps 126. Wing clamps 126 abuttingly join the rear side of the first and second portion and extend entirely therethrough.

In the present implementation, second portion 123 further includes an elastic member 127. The elastic member 127 is positioned along the bottom end of the second portion and is configured to extend a length thereof. The elastic member 127 may be provided as a rubber elastic member, any suitable elastic member may be implemented. The elastic member 127 allows for the second portion 123 to conform to the bottom end of a vehicle stepper regardless of the shape or model of the stepper. As a result, system 100 has a universal configuration and can fit onto any vehicle stepper. It should be understood that other variations of system 100 may be provided that omit the elastic member 127.

Brush assembly 140 further includes a brush pad 142 and a plurality of brush bristles 144. In the present embodiment, brush pad 142 may be provided as a rectangular structural member that is operatively mounted to the top end of the first portion 122. In one embodiment, brush pad 142 is mounted to the first portion 122 by means of threaded fasteners that are engaged with the pad and the first portion 122. In another embodiment, the combination of slot and slot members from the first embodiment may be implemented into the present embodiment.

Referring now to FIG. 9, it can be observed a system for a vehicle mounted shoe cleaner 200, in accordance with a second embodiment of the present invention which basically includes a mount assembly 220 and a brush assembly 240.

Mount assembly 220 is operatively mounted to the bottom end of a vehicle along a vehicle door. A support member 222 is operatively engaged to the frame of the vehicle. In the present embodiment, a fastener 224 is implemented to secure the support member 222 to the frame of the vehicle. Support member 222 includes an integral swivel mount 226 that is configured to receive brush assembly 240 mounted thereon. Swivel mount 226 is provided as a structural member with a circular channel that enables the swiveling motion of the brush assembly 140.

Brush assembly 240 includes a brush section 242 and a mount section 244. In the present embodiment, mount section 244 is operatively engaged with the swivel mount 226. Mount section 244 is configured to be able to rotate freely when secured to the swivel mount 226. In the present implementation, a swivel member 246 joins the mount section 244 and the swivel mount 226 to facilitate the swiveling motion thereon. The brush section is then able to swivel to reveal and hide the brush section. In one embodiment, a sensor is in operative communication with the system 200 which allows for the brush to swivel outwardly when the door for the vehicle is open and swivel inwardly when the door for the vehicle is closed.

Referring now to FIG. 10, it can be observed a system for a vehicle mounted shoe cleaner 300, in accordance with a second embodiment of the present invention which basically includes a housing assembly 320 and a brush assembly 340.

Housing assembly 300 includes a housing 320 that is configured to be mounted to a bottom side of a vehicle onto a vehicle frame. Housing 320 may be rectangular in shape. Housing 320 further includes a slide stop 322 positioned within a top end interior of the housing. A front face of the housing includes a plurality of debris bristles 324 which prevent for outside debris to enter the housing. The brush assembly 340 is supported by rollers 325 that are located within the housing and actuated by a motor 324 located therein. A magnet 326 is positioned along the rear face of the housing that allow for the housing 320 to be operatively engaged to the frame of the vehicle.

Brush pad assembly 340 includes a brush pad 342 with a plurality of bristles 344 that are positioned within the interior of the housing. A rear end of the brush pad 342 includes a stopper 346. In the present embodiment, brush pad 342 is actuated to exit the housing to provide the brush to a user before entering a car. Stopper 346 then meets the slide stop 322 and the brush is presented to the user. In one embodiment, the system 300 includes a sensor which is configured to actuate the brush pad when the car door is opened.

Referring now to FIGS. 11 and 12, it can be observed a system for a vehicle mounted shoe cleaner 400, in accordance with a third embodiment of the present invention which basically includes a pad assembly 420 and a brush assembly 440.

Pad assembly 420 includes a first portion 422, and a third portion 426. In the present embodiment, first portion 422 is a top portion that is operatively joined to second portion 424 which is a bottom portion via a hinge 424. The concatenation of the first portion 422, hinge 424 and second portion 426 define a structure that allows for the system 400 to have a configuration that could be mounted onto the stepper having a cylindrical shape. It can be observed that the first portion 422 and the second portion 426 may be locked together by means of a wing clamps 428. Brush assembly 440 further includes a plurality of brush bristles 444.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a vehicle mounted shoe cleaner, comprising:
    a) a pad assembly including a first portion and a second portion, wherein the second portion includes a raised edge, wherein said first portion and said second portion each includes a top surface having slots thereon, wherein said first portion and said second portion each include inner channels, wherein bolts are inserted through the inner channels to operatively join the first portion and the second portion; and
    b) a brush assembly including a brush pad with a plurality of bristles, said brush pad having slot members which are operatively mounted to the slots of the top surface of the first and second portion.

2. The system for a vehicle mounted shoe cleaner of claim 1 wherein said raised edge includes a squeegee.

3. The system for a vehicle mounted shoe cleaner of claim 1 wherein said first portion and said second portion each includes a bottom surface having rubber grips.

4. The system for a vehicle mounted shoe cleaner of claim 1 wherein said slots are indentations or depressions.

5. The system for a vehicle mounted shoe cleaner of claim 1 wherein said pad assembly is mounted onto a vehicle stepper.

6. The system for a vehicle mounted shoe cleaner of claim 1 wherein said inner channels for the first portion extend entirely through the first portion.

7. The system for a vehicle mounted shoe cleaner of claim 1 wherein said inner channels for the second portion extend partially through the second portion.

8. The system for a vehicle mounted shoe cleaner of claim 1 wherein said bolts includes a threaded portion.

9. The system for a vehicle mounted shoe cleaner of claim 1 wherein said first portion and said second portion are each rectangular in shape, said second portion having a greater area than said first portion.

10. The system for a vehicle mounted shoe cleaner of claim 1 wherein said first portion and said second portion are abuttingly joined.

\* \* \* \* \*